United States Patent Office 3,541,136
Patented Nov. 17, 1970

3,541,136
PROCESS FOR PREPARING DIALKYL
TEREPHTHALATES
Charles J. Lind, Hamburg, N.Y., assignor to Allied Chemical Corporation, New York, N.Y., a corporation of New York
No Drawing. Continuation-in-part of application Ser. No. 523,272, Jan. 27, 1966. This application Dec. 12, 1967, Ser. No. 689,818
Int. Cl. C07c 69/82
U.S. Cl. 260—475       13 Claims

ABSTRACT OF THE DISCLOSURE

Dialkyl terephthalates are prepared in high yield by heating a mixture of terephthalic acid and at least 2 molar equivalents of a monohydric alcohol under superatmospheric pressure in the presence of a molybdenum compound and an oxidizing agent. The molybdenum compound is preferably one which contains molybdenum in a positive oxidation state of six and the oxidizing agent is either a nitro-compound of the benzene series or a molecular oxygen-containing gas.

BACKGROUND OF THE INVENTION

This is a continuation-in-part of my copending U.S. patent application Ser. No. 523,272, filed Jan. 27, 1966, now abandoned.

The present invention relates to the production of organic esters and more particularly to an improved method of producing esters of aromatic dicarboxylic acids. It is especially concerned with an improved process for esterifying terephthalic acid with lower primary monohydric aliphatic alcohols.

The esters of terephthalic acid derived from lower primary monohydric aliphatic alcohols, e.g., dimethyl terephthalate, are precursors of polyalkylene terephthalates, e.g., polyethylene terephthalate, which are commercially important polymers.

Esterification of terephthalic acid with lower primary monohydric aliphatic alcohols is exceedingly slow and hence various expedients have been proposed to accelerate the reaction. For example, it is known to employ sulfuric acid as a catalyst in the esterification but use of this strong acid results in the loss of large amounts of the alcohol through ether formation.

In order to avoid ether formation, it has been proposed to employ, per se, metals of variable valence, e.g., zinc, copper, cobalt, molybdenum, etc., and compounds thereof as catalysts in the esterification. However, the use of metallic catalysts in this manner generally accelerates the esterification of terephthalic acid only to a slight extent, resulting in low conversions of carboxy groups to carboalkoxy groups (generally no more than about 40% when esterification is carried out for 10 minutes) and in correspondingly low yields of bis-lower alkyl terephthalate.

SUMMARY OF THE INVENTION

Therefore, it is an object of the present invention to provide an improved process for preparing diesters of terephthalic acid from lower primary monohydric aliphatic alcohols.

Another object of the invention is to provide a more rapid process for esterifying terephthalic acid with a lower primary monohydric aliphatic alcohol in the presence of a molybdenum-containing catalyst than was previously known.

Yet another object of the invention is to provide a catalyst composition to enhance the rate of esterification of terephthalic acid with a lower primary monohydric aliphatic alcohol.

These and other objects and advantages of the invention will be apparent from the following description and claims.

In accordance with the present invention, the aforementioned disadvantages of the prior art procedures are overcome and more rapid esterification of terephthalic acid with a lower primary monohydric aliphatic alcohol is achieved by heating a mixture of the alcohol and terephthalic acid in the presence of a catalyst comprising:

(a) a molybdenum esterification catalyst; and
(b) an oxidizing agent selected from the group consisting of a nitro-compound of the benzene series, and a molecular oxygen-containing gas.

Molybdenum catalysts suitable for use in the present invention are preferably compounds which contain molybdenum in a positive oxidation state of six. Representative examples of molybdenum compounds which can be employed in the esterification process of this invention include:

molybdenum trioxide ("molybdic oxide")
molybdic acid
molybdenum hexacarbonyl
ammonium paramolybdate $((NH_4)_6Mo_7O_{24} \cdot 4H_2O)$
sodium molybdate dihydrate
strontium molybdate
cobalt molybdate
nickel molybdate
copper molybdate
zinc molybdate
zirconium molybdate
molybdenum carbide
molybdenum dioxide Molybdenum trioxide, molybdic acid, molybdenum hexacarbonyl and molybdate salts, i.e., metallic salts of molybdic acid (including ammonum molybdate) give particularly good results in the esterification, and hence are especially preferred. Metallic salts of molybdic acid suitable for use in the present invention are those generally derived from alkali metals, alkaline earth metals, transition metals, rare earth metals, ferrous metals, metalloids, and the like.

The process of this invention can be conducted in any suitably constructed reaction vessel of a material which is inert toward the reactants. However, reaction vessels made of molybdenum alloys containing more than about 4% by weight molybdenum, e.g., "Hastelloy C," a nickel-based alloy containing about 16% by weight molybdenum, are particularly suitable for use in the invention, especially when used in combination with a molybdenum-containing compound of the type herein disclosed. The walls of such reaction vessels have a catalytic effect upon the reaction system in contact therewith.

Nitro compounds of the benzene series which are suitable for use as oxidizing agents in the present invention are represented by the following formula:

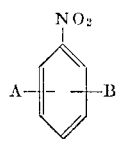

wherein:

A is selected from the group consisting of hydrogen, halogen, lower alkyl, lower alkoxy, lower carbalkoxy, carboxyl, amino, lower monoalkylamino, and lower dialkylamino radicals;

B is selected from the group consisting of hydrogen, nitro, halogen, lower alkyl, lower alkoxy, lower carbalkoxy, carboxyl, amino, lower monoalkylamino, and lower dialkylamino radicals.

The term "halogen radical" is intended to include chloro, bromo, iodo, and fluoro substituents. The term "lower alkyl radical" is intended to embrace alkyl groups of less than about 6 carbon atoms.

Representative examples of nitro compounds of the benzene series which are suitable for use in the present invention include the following:

nitrobenzene
o-, m-, and p-dinitrobenzene
o-, m-, and p-nitrotoluene
o-, m-, and p-chloronitrobenzene
o-, m-, and p-fluoronitrobenzene
o-, m-, and p-nitroaniline
o-, m-, and p-nitro-N, N-dimethylaniline
o-, m-, and p-nitro-N-ethylaniline
o-, m-, and p-nitrobenzoic acid
o-, m-, and p-nitroanisole
the methylethylnitrobenzenes
the bromomethylnitrobenzenes
the iodofluoronitrobenzenes
the aminonitrophenetoles
the carbethoxynitrotoluenes When employing a nitrocompound of the benzene series as the oxidizing agent in the process of the present invention, nitrobenzene is preferred.

Molecular oxygen-containing gases which are suitable for use as oxidizing agents in the present invention are represented by the following examples:

air (23.14% by weight oxygen)
oxygen
mixtures of air and nitrogen
mixtures of oxygen and nitrogen
mixtures of oxygen and carbon dioxide.

Preferably, a molecular oxygen-containing gas is employed as the oxidizing agent. Such a gas may contain molecular oxygen in amounts greater than, equal to, or less than the amount of oxygen present in air. Desirably, the gas may be air or a mixture of air and nitrogen containing between about 0.42% and about 23.14% by weight of oxygen.

The esterification reaction of the present invention is conducted under superatmospheric pressure, i.e., pressures greater than one atmosphere. As an engineering convenience, the process is preferably carried out under autogenous or super-autogenous pressure. By "autogenous" pressure is meant the pressure developed by combining the reactants at room temperature and atmospheric pressure and then heating the resultant mixture in a closed system to the desired reaction temperature. Super-autogenous reaction pressures are conveniently obtained by charging the reaction vessel at room temperature and at greater than atmospheric pressure followed by closing the system and heating it to the reaction temperature.

On completion of the esterification, the reaction mixture is processed in a conventional manner, e.g., by cooling the hot reaction mixture to ambient temperature and collecting the solid product by filtration. Unreacted alcohol is recovered in the filtrate and may contain dissolved molybdenum catalyst. It may be reused to esterify a fresh batch of terephthalic acid, generally without the need for further addition of catalyst. Alternatively, the hot reaction mixture may be cooled to ambient temperature, admixed with water, and filtered to isolate the crude diester. This crude diester is advantageously recrystallized from a lower aliphatic alcohol, preferably the alcohol employed in the esterification. It is obvious from the foregoing that the process of the present invention may be readily conducted in either a batchwise or continuous manner.

The acid substrate used in the process of the invention is preferably pure terephthalic acid. However, terephthalic acid (ca. 90% pure) obtained by conventional molecular oxygen, nitric acid and sulfur oxidation of dialkyl substituted benzenes, such as p-xylene, or oxygenated derivatives thereof may also be utilized.

Lower primary monohydric aliphatic alcohols, i.e., primary alcohols of 1 to 4 carbon atoms which can be employed in the process of the invention include, for example:

methyl alcohol            n-butyl alcohol
ethyl alcohol             iso-butyl alcohol.
n-propyl alcohol Methyl alcohol is preferably employed in the esterification. In other words, the improved process according to this invention is preferably applied to the production of dimethyl terephthalate.

The amount of molybdenum catalyst employed in the esterification process of this invention can vary over a wide range. Amounts of molybdenum-containing catalyst sufficient to provide as little as about 0.005% by weight molybdenum based on the weight of the terephthalic acid, will accelerate the esterification. Preferably, sufficient molybdenum catalyst is employed to provide about 0.01 to 0.5% by weight of molybdenum based on the weight of terephthalic acid charged to the reactor. Use of as much as 5.0% or more of molybdenum based on the weight of terephthalic acid charged, while effective, affords no added advantage and is deemed wasteful of the catalyst.

In general, the amount of oxidizing agent charged will depend upon the particular molybdenum catalyst and oxidizing agent employed. Thus, when employing as catalyst molybdenum in an oxidation state of six, nitro compounds of the benzene series are used in amounts of between about $0.02/n$ and about $2.0/n$ part moles and preferably between about $0.05/n$ and about $1.0/n$ part mole per part by weight molybdenum in the catalyst, wherein $n$ is the number of nitro groups in the aromatic nitro compound and said part moles and parts by weight are expressed in self-consistent units. On the other hand, when using a molecular oxygen-containing gas as oxidizing agent in conjunction with a molybdenum compound, the amount of molecular oxygen-containing gas charged will depend upon the total reaction pressure and upon the molar concentratiton of oxygen in the gas. An excellent conversion of the carboxyl groups of the terephthalic acid to carboalkoxy groups is generally achieved by:

(1) Employing superatmospheric pressures (preferably autogenous reaction pressure) and charging a molecular oxygen-containing gas having an oxygen content which is less than or about equal to the oxygen content of air so as to provide from about 0.16 to 2 part mole or more advantageously from about 0.5 to 1.5 part mole oxygen per part by weight molybdenum, or (2) Employing superatmospheric pressure (desirably autogenous reaction pressure) and charging a molecular oxygen-containing gas having an oxygen content which is greater than the oxygen content of air to provide about 0.08 part mole or more of oxygen per part by weight molybdenum, or (3) Employing a super-autogenous reaction pressure and charging a molecular oxygen-containing gas having an oxygen content which is less than, or about the same as the oxygen content of air to provide 0.08 part mole or more of oxygen per part by weight molybdenum in the catalyst. Use of the last two modes of operation employing an amount of molecular oxygen-containing gas corresponding to about 0.08 to 0.16 part mole oxygen per part by weight molybdenum in the catalyst is especially preferred. The above amounts of oxidizing agent charged to the reactor according to the invention do not include small amounts of oxygen dissolved as air in the alcohol at ambient conditions.

Esterification according to the process of the present invention is carried out using at least a molecular excess of alcohol and preferably at least about 2 moles of alcohol per mole of terephthalic acid. An especially good result is obtained using between about 15 and about 30 moles of the alcohol per mole of terephthalic acid. Use of more than about 50 moles of alcohol per mole of terephthalic acid, while effective, generally offers no advantage.

The esterification process of the present invention is preferably carried out at temperatures in the range of between about 190° C. and the critical temperature of the alcohol, e.g., 240° C. in the case of methyl alcohol. In esterifying terephthalic acid with methyl alcohol an especially good result is obtained employing a reaction temperature of between about 200° C. and about 225° C.

The super-autogenous reaction pressures contemplated in the aforementioned preferred modes of esterifying terephthalic acid are generally about 25 p.s.i. to about 500 p.s.i. and especially about 50 to about 300 p.s.i. greater than the corresponding autogenous reaction pressures developed using the same temperature, esterification vessel, and charges of alcohol and terephthalic acid.

The duration of the esterification reaction according to this invention will vary somewhat depending on the reaction conditions employed (i.e., temperature, pressure, type of reactants used, and the proportions thereof). In general, however, the esterification is carried out for less than about 90 minutes and preferably for about 10 to about 30 minutes.

According to the process of the invention, conversion of carboxy groups of the terephthalic acid to carboalkoxy groups is greater than about 50%, and when operating under preferred conditions, is as high as about 90–98% (corresponding to a yield of bis-lower alkyl terephthalate of at least about 80%) even when esterification is conducted for periods as short as about 10 minutes.

DESCRIPTION OF THE PREFERRED EMBODIMENTS

In the following examples, which serve to illustrate the invention, parts and percentages are by weight unless otherwise indicated; reaction pressures are reported with an accuracy of about ±25 p.s.i.g.

EXAMPLE 1

An autoclave of 316 stainless steel equipped with an impeller-type stirrer and having a capacity of 3860 parts by volume, is charged with a mixture of 135 parts (0.813 mole) of terephthalic acid, 675 parts (21.1 moles) of methyl alcohol (corresponding to 26 moles of alcohol per mole of terephthalic acid) and 0.0757 part of finely divided technical grade (i.e., 89.2% pure) molybdic oxide which contains 0.0675 part of molybdic oxide (corresponding to 0.0334% molybdenum based on terephthalic acid charged). Other substances present in the technical grade molybdic oxide catalyst include the following (percentages are by weight): 0.12% copper, $8 \times 10^{-4}\%$ zirconium, less than about $5 \times 10^{-4}\%$ cobalt, 0.24% aluminum, 0.2% calcium, less than about $1 \times 10^{-4}\%$ chromium, 0.48% iron, 0.048% lead, 0.1% magnesium, 0.016% manganese, $9 \times 10^{-4}\%$ nickel, 1.97% silicon, 0.06% sulfur, 0.019% tin, 0.018% titanium, and 0.01% tungsten. The autoclave is sealed at 25° C. and atmosphere pressure to enclose about 2960 parts by volume of air, i.e., 0.811 part oxygen, corresponding to 0.564 part mole oxygen per part by weight molybdenum in the esterification catalyst. The mixture is heated over a period of 60 to 75 minutes with vigorous agitation to 224–226° C. and then maintained at this temperature under a pressure of about 775 p.s.i.g. for an additional ten minutes. The reaction mixture is then cooled under pressure over a period of 70 minutes to ambient temperature and removed from the autoclave. This crude product is treated with 2000 parts of water at about 20° C. and agitated for 30 minutes at ambient temperature. The resulting slurry is filtered to collect the crude dimethyl terephthalate, which is dried in air at 70–80° C. for about 16 hours. The dry, crude product (152.5 parts) contains 0.1534 equivalent of aromatic carboxylic acids, i.e., unreacted terephthalic acid and/or monomethyl terephthalate. This corresponds to a conversion of about 88.3% of the carboxy groups of the terephthalic acid. The esterification product contains at least about 125 parts of dimethyl terephthalate. This corresponds to a yield of 80% of theory calculated on the basis that all aromatic carboxylic acid present in the product is monomethyl terephthalate. The crude dimethyl terephthalate is recrystallized from methanol to recover pure dimethylterephthalate.

EXAMPLE 2

This example illustrates the low rate of esterification of terephthalic acid with methanol in the absence of a molybdenum-containing compound.

The procedure of Example 1 is repeated substantially as described except that no molybdenum trioxide is charged to the reaction mixture. The dry, crude dimethyl terephthalate (135.5 parts) which is recovered contains 1.28 equivalents of aromatic carboxylic acids, i.e., unreacted terephthalic acid and/or monomethyl terephthalate (which corresponds to a conversion of about 18.5% of the carboxy groups present in the terephthalic acid and to at most 29.2 parts, i.e., 18.5% yield of theory, of dimethyl terephthalate in the crude product, calculated on the basis that all the aromatic carboxylic acid present in the product is terephthalic acid).

EXAMPLES 3–20

In Examples 3–20, the results of which are reported in Table I, the esterification procedure of Example 1 is repeated except that the alloy of the autoclave and the type and amount of molybdenum compound charged are varied as indicated in the table. In Examples 3–7, a mixture (about 565 parts by volume) of 84.4 parts (0.507 mole) of terephthalic acid and 422 parts of methyl alcohol are charged to the autoclave so that about 3295 parts by volume of air, measured at 25° C. at atmospheric pressure and corresponding to about 0.90 part of oxygen per part molybdenum in the catalyst are enclosed in the autoclave.

($0.110 \times 10^{-2}$ mole, corresponding to 0.0244 part mole nitrobenzene per part by weight molybdenum in the catalyst) is charged as oxidizing agent. The autoclave is purged

TABLE 1.—ESTERIFICATION OF TEREPHTHALIC ACID WITH METHANOL

| Example | Autoclave alloy | Catalyst charged | Percent catalyst charged based on terephthalic acid charged | Percent conversion of carboxy groups of terephthalic acid |
|---|---|---|---|---|
| 3 | Hastelloy C (a nickel-base alloy containing 54% nickel and 16% molybdenum). | None | | 56.6 |
| 4 | As in Ex. 3 | Molybdenum trioxide (Reagent Grade, 99.5% MoO$_3$). | 0.5 | 95.8 |
| 5 | do | As in Ex. 4 | 0.05 | 85.5 |
| 6 | do | Molybdenum hexacarbonyl | 0.05 | 80.5 |
| 7 | do | Cobaltous acetate tetrahydrate | 0.868 | 74.6 |
| 8 | As in Ex. 1 | As in Ex. 4 | 0.05 | 64.8 |
| 9 | do | Zinc molybdate | 0.05 | 85.0 |
| 10 | do | Molybdenum carbide | 0.05 | 63.8 |
| 11 | do | Sodium molybdate dihydrate | 0.05 | 65.0 |
| 12 | do | Zirconium molybdate | 0.05 | 75.1 |
| 13 | do | Cobalt molybdate | 0.05 | 85.2 |
| 14 | do | Nickel molybdate | 0.05 | 84.3 |
| 15 | do | Copper molybdate | 0.05 | 85.0 |
| 16 | do | Copper powder | 0.05 | 25.9 |
| 17 | do | 1:1 mixture of the catalyst of Ex. 4 and the catalyst of Ex. 16. | 0.1* | 93.9 |
| 18 | do | Zinc powder | 5.0 | 37.2 |
| 19 | do | 1:1 mixture of the catalyst of Ex. 4 and the catalyst of Ex. 18. | [1] 0.1 | 92.8 |
| 20 | do | 1:1.77 mixture of the catalyst of Ex. 4 and zinc oxide. | [1] 0.05 | 87.4 |

[1] Percent catalyst mixture based on terephthalic acid charged.

EXAMPLE 21

A mixture of 93.7 parts (0.564 mole) of terephthalic acid, 675 parts (14.65 moles) of anhydrous ethyl alcohol (which corresponds to 25.95 moles of ethyl alcohol per mole of terephthalic acid), 0.0469 part of zinc molybdate monohydrate (which corresponds to about 0.02% of molybdenum based on the terephthalic acid charged) and 2957 parts by volume of air corresponding to 0.81 part of oxygen or 1.37 part moles of oxygen per part molybdenum in the zinc molybdate esterification catalyst is heated for 10 minutes at 225° C. under an autogenous pressure of about 600 p.s.i.g. In accordance with the procedure of Example 1. The crude, dry diethyl terephthalate (104 parts) which is recovered in a manner substantially as described in Example 1, contains 0.457 equivalent of aromatic carboxylic acids, i.e., unreacted terephthalic acid and/or monoethyl terephthalate. This corresponds to a conversion of about 52.5% of the carboxy groups of the terephthalic acid.

EXAMPLE 22

This example illustrates the low rate of esterification of terephthalic acid with ethanol in the absence of a molybdenum-containing compound.

The procedure of Example 21 is repeated substantially as described except that no zinc molybdate is employed. The dry, crude esterification product (90.0 parts) which is recovered contains 1.01 equivalents of aromatic carboxylic acids, i.e., unreacted terephthalic acid and/or monoethyl-terephthalate. This corresponds to a conversion of about 5.03% of the carboxy groups present in the terephthalic acid.

EXAMPLE 23

The following example illustrates the use of a nitro-compound of the benzene series as the oxidizing agent in promoting the catalysis of the esterification of terephthalic acid by molybdenum-containing compound according to the invention.

Part A

The procedure of Example 1 is repeated substantially as described except that, instead of using technical grade molybdic oxide, 0.0675 part of finely divided reagent grade molybdenum trioxide (Climax Co., "undensified" containing 99.95% molybdenum trioxide, corresponding to 0.0334% molybdenum based on the terephthalic acid charged) is employed and 0.135 part of nitrobenzene of air by a stream of nitrogen before being sealed at ambient temperature and pressure and the esterification is effected at an autogenous pressure of about 810 p.s.i.g. instead of 775 p.s.i.g. as in Example 1. The dry crude product (151 parts) which is obtained contains 0.238 equivalent of aromatic carboxylic acids, i.e., unreacted terephthalic acid and/or monomethyl terephthalate. This corresponds to a conversion of about 83% of the carboxy groups of the terephthalic acid.

Part B

The procedure of Part A is repeated substantially as described omitting the addition of nitrobenzene. The dry crude product (145.5 parts) contains 0.636 equivalent of aromatic carboxylic acids. This corresponds to a conversion of only about 58.5% of the carboxy groups of the terephthalic acid. This relatively low conversion indicates the relatively weak catalytic effect of a molybdenum-containing compound on the esterification of terephthalic acid in the absence of an oxidizing agent other than oxygen dissolved as air in the alcohol at atmospheric pressure and 25° C., i.e., $6.36 \times 10^{-5}$ part oxygen per part methyl alcohol (corresponding to a total of 0.043 part oxygen or about 0.03 part mole oxygen per part by weight molybdenum in the catalyst).

EXAMPLE 24

This example illustrates the relatively weak catalysis of the esterification of terephthalic acid by a molybdenum-containing compound in the presence of only atmospheric oxygen (corresponding to less than about 0.16 mole of oxygen per part molybdenum) at reaction pressures which are autogenous.

The procedure of Example 1 is repeated substantially as described except that 406.3 parts of terephthalic acid, 1625 parts of methyl alcohol, and 0.2032 part of the molybdenum trioxide catalyst of Example 23 are charged to the autoclave; the autoclave was sealed at 25° C. and atmospheric pressure to enclose about 1580 parts by volume of air ($1.35 \times 10^{-2}$ parts oxygen corresponding to about 0.1 part mole oxygen per part molybdenum in the catalyst), and the mixture was heated at 200° C. at an autogenous pressure of about 500 p.s.i.g. for 20 minutes. The resulting dry, crude product (445.5 parts) which is recovered contains 1.68 equivalents of aromatic carboxylic acids, i.e., terephthalic acid and/or monomethyl terephthalate. This corresponds to a conversion of only about 64.5% of the carboxyl groups of the terephthalic acid.

C. for 15 and 20 minutes, respectively, using atmospheric oxygen under autogenous pressure. The results of these examples are compared with those of Examples 28–29 in Table II below.

TABLE II

| Example | Composition of gas phase in sealed autoclave at 25° C. | Moles O₂ charged per part molybdenum in catalyst | Duration of the reaction, minutes | Reaction temp., ° C. | Reaction pressure, p.s.i.g. | Percent conversion of the carboxy groups of the terephthalic acid |
|---|---|---|---|---|---|---|
| 28 | 1580 parts by volume of air at atmospheric pressure with nitrogen charged to a total pressure of 100 p.s.i.g. | 0.089 | 15 | 225 | 910 | 95.9 |
| 29 | As in Example 28 | 0.089 | 20 | 225 | 975 | 96.5 |
| 30 | 1580 parts by volume of air at atmospheric pressure. | 0.089 | 15 | 225 | 800 | 86.8 |
| 31 | As in Example 30 | 0.089 | 20 | 225 | 810 | 91.8 |

The following Examples 25–27 illustrates the use of super-autogenous pressure and atmospheric oxygen to promote the molybdenum-catalyzed esterification of terephthalic with an aliphatic alcohol according to my invention when using more than 0.16 part mole oxygen per part molybdenum in the catalyst.

EXAMPLE 25

The procedure of Example 24 is repeated substantially as described except that 250 parts of terephthalic acid, 1250 parts of methyl alcohol and 0.1250 part of the molybdenum trioxide catalyst are charged and the autoclave pressurized with 40 p.s.i.g. of air at 25° C. prior to being sealed and heated in order to provide a super-autogenous reaction pressure of 600 p.s.i.g. at 200° C. This corresponds to 0.807 part mole oxygen per part by weight of molybdenum. A carboxyl group conversion of 76.8% was obtained.

EXAMPLE 26

The procedure of Example 25 is repeated except that esterification is effected at 215° C. instead of 200° C. to afford a reaction pressure of 750 p.s.i.g. Carboxyl group conversion=93.9%.

EXAMPLE 27

The procedure of Example 25 is repeated except that esterification is affected at 225° C. instead of 200° C. to afford a reaction pressure of 890 p.s.i.g. Carboxyl group conversion=95.4%.

The following Examples 28–31 illustrate the molybdenum-catalyzed esterification of terephthalic acid with a primary aliphatic monohydric alcohol under an atmosphere which contains oxygen in a lower molar proportion than air (corresponding to about 0.08–0.16 part mole oxygen per part molybdenum in the esterification catalyst). Super-autogenous reaction pressures are used which were obtained by pressurizing the autoclave with nitrogen at 25° C. prior to heating.

EXAMPLES 28–29

In these examples the procedure of Example 24 is repeated employing 325 parts of terephthalic acid, 1625 parts of methyl alcohol, and 0.2275 part of the molybdenum trioxide catalyst except that the autoclave is sealed at 25° C. to enclose a gas phase of the composition indicated in Table II. The results of these experiments are reported in Table II.

EXAMPLES 30–31

In Examples 30–31, the procedure of Examples 28–29 is repeated except that the reaction is conducted at 225°

The foregoing examples are presented for the purpose of illustrating the present invention and are not intended to limit the scope thereof. Changes and variations in materials and procedures may be made without departing from the purview of the invention as defined in the following claims.

What is claimed is:

1. A process for producing lower alkyl esters of terephthalic acid which comprises reacting terephthalic acid with a lower primary monohydric aliphatic alcohol at an elevated temperature and autogenous or super-autogenous pressure in the presence of a hexavalent molybdenum compound and an oxidizing agent selected from the group consisting of (A) a molecular oxygen-containing gas which (1) has an oxygen content which is less than or equal to the oxygen content of air and is present in such amounts as to provide at least about 0.16 part mole oxygen per part by weight of molybdenum or (2) has an oxygen content which is greater than the oxygen content of air and is present in such amounts as to provide at least about 0.08 part mole oxygen per part by weight of molybdenum or (3) has an oxygen content which is less than or equal to the oxygen content of air and is present in such amounts as to provide at least about 0.08 part mole oxygen per part by weight of molybdenum, said pressure being super-autogenous when said gas is as characterized in (3); and (B) a nitro-compound of the formula:

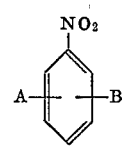

wherein
A is a substituent selected from the group consisting of hydrogen, halogen, lower alkyl, lower alkoxy, lower carbalkoxy, carboxyl, amino, lower monoalkylamino, and lower dialkylamino radicals; and
B is a substituent selected from the group consisting of hydrogen, nitro, halogen, lower alkyl, lower alkoxy, lower carbalkoxy, carboxyl, amino, lower monoalkylamino, and lower dialkylamino radicals.

2. A process according to claim 1 wherein:
the molybdenum compound is employed in sufficient concentration so as to provide at least about 0.005% by weight molybdenum based on the weight of terephthalic acid;
the alcohol is present in at least a stoichiometric quantity; and
the temperature employed is at least about 190° C.

3. A process according to claim 1 wherein the alcohol is selected from the group consisting of methanol, ethanol, n-propanol, n-butanol, and isobutanol.

4. A process according to claim 1 wherein the molybdenum compound is selected from the group consisting of molybdenum trioxide, molybdic acid, molybdenum hexacarbonyl, and a molybdate salt.

5. A process according to claim 4 wherein the oxidizing agent is a molecular oxygen-containing gas as characterized in (3) and is selected from the group consisting of air, oxygen, mixtures of air and nitrogen, mixtures of oxygen and nitrogen and mixtures of oxygen and carbon dioxide.

6. A process according to claim 5 wherein:
the alcohol is methanol;
the molybdenum compound is molybdenum trioxide; and
the molecular oxygen-containing gas is air.

7. A process according to claim 5 wherein:
the alcohol is methanol;
the molybdenum compound is molybdenum hexacarbonyl; and
the oxygen-containing gas is air.

8. A process according to claim 5 wherein:
the alcohol is methanol;
the molybdenum compound is a molybdate salt; and
the oxygen-containing gas is air.

9. A process according to claim 5 wherein:
the alcohol is ethanol:
the molybdenum compound is a molybdate salt; and
the oxygen-containing gas is air.

10. A process according to claim 4 wherein the oxidizing agent is a nitro compound selected from the group consisting of nitrobenzene, o-, m-, and p-nitrotoluene, o-, m-, and p-dinitrobenzene, and o-, m-, and p-chloronitrobenzene, said nitro compound being present in an amount between about $0.02/n$ and about $2.0/n$ part moles per part by weight molybdenum, wherein $n$ represents the number of nitro substituents per molecule of the nitro compound.

11. A process according to claim 10 wherein:
the alcohol is methanol;
the molybdenum compound is molybdenum trioxide; and
the nitro compound is nitrobenzene.

12. A process as claimed in claim 1 wherein the oxidizing agent is a molecular oxygen-containing gas as characterized in (2).

13. A process as claimed in claim 1 wherein the oxidizing agent is a molecular oxygen-containing gas as characterized in (1).

References Cited
UNITED STATES PATENTS 3,329,826    7/1967    Pine et al.    260—410.6

JAMES A. PATTEN, Primary Examiner

E. J. SKELLY, Assistant Examiner

U.S. Cl. X.R.

252—430, 431, 467